(12) United States Patent
Johnson

(10) Patent No.: US 6,737,180 B2
(45) Date of Patent: May 18, 2004

(54) ELECTROCHEMICAL CONVERSION SYSTEM

(75) Inventor: Lonnie G. Johnson, Atlanta, GA (US)

(73) Assignee: Johnson Electro Mechanical Systems, LLC, Atlanta, GA (US)

( * ) Notice: Subject to any disclaimer, the term of this patent is extended or adjusted under 35 U.S.C. 154(b) by 153 days.

(21) Appl. No.: 10/032,314

(22) Filed: Dec. 31, 2001

(65) Prior Publication Data

US 2002/0064692 A1 May 30, 2002

Related U.S. Application Data

(63) Continuation-in-part of application No. 09/546,654, filed on Apr. 10, 2000.

(51) Int. Cl.⁷ .......................... H01M 8/06; H01M 14/00
(52) U.S. Cl. ............................. 429/11; 429/17; 429/20; 429/101; 429/120
(58) Field of Search ........................... 429/11, 17, 19, 429/20, 30, 31, 101, 120

(56) References Cited

U.S. PATENT DOCUMENTS

| | | | |
|---|---|---|---|
| 4,040,410 A | 8/1977 | Libowitz | 126/270 |
| 4,049,877 A | 9/1977 | Saillant et al. | 429/11 |

(List continued on next page.)

FOREIGN PATENT DOCUMENTS

| | | |
|---|---|---|
| EP | 0 168 062 B1 | 12/1981 |
| EP | 0 055 855 A2 | 7/1982 |
| EP | 0 071 271 A2 | 2/1983 |
| EP | 0 168 062 A2 | 1/1986 |

OTHER PUBLICATIONS

Terry Cole, Science (vol. 221) Thermoelectric Energy Conversion with Solid Electroytes, (Sep. 1983).
Heat Pumps Using Organometallic Liquid Absorbents, K. Thomas Feldman, Jr., Craig M. Jensen, Kwang J. Kim, Arsalan Razani, (date unknown).

*Primary Examiner*—Stephen Kalafut
(74) *Attorney, Agent, or Firm*—Baker Donelson

(57) ABSTRACT

An electrochemical conversion system (70) is disclosed having a tubular housing (71), a thermal inertial core (72), and a tubular hydrogen electrochemical cell (79) which in combination define a first chamber (73) and a second chamber (74). A first tubular mass of hydride material (90) is contained within the first chamber while a second tubular mass of hydride material (91) is contained within the second chamber. The hydrogen concentration cell has a first gas diffusion electrode (20), a second gas diffusion electrode (21) and a proton conductive membrane (22) therebetween. The release of hydrogen from one of the masses of hydride material and its redox reaction creates an electrical potential across the cell. The housing (71) is adapted to transfer heat to and from the second mass of hydride material (91). Heat is also transferred between the thermal inertial core (72) and the first mass of hydride material (90).

13 Claims, 4 Drawing Sheets

U.S. PATENT DOCUMENTS

| | | | | |
|---|---|---|---|---|
| 4,098,958 | A | 7/1978 | Bettman | 429/17 |
| 4,235,956 | A * | 11/1980 | Gross et al. | 429/120 X |
| 4,422,500 | A | 12/1983 | Nishizaki et al. | 165/104.12 |
| 4,523,635 | A | 6/1985 | Nishizaki et al. | 165/104.12 |
| 4,562,511 | A | 12/1985 | Nishino et al. | 361/324 |
| 4,677,038 | A | 6/1987 | Salomon | 429/17 |
| 4,692,390 | A | 9/1987 | Roy | 429/17 |
| 4,719,158 | A * | 1/1988 | Salomon | 429/101 X |
| 4,781,029 | A | 11/1988 | Ser Vaas | 60/641.7 |
| 4,818,638 | A | 4/1989 | Roy | 429/20 |
| 5,139,895 | A | 8/1992 | Roy et al. | 429/17 |
| 5,336,573 | A | 8/1994 | Zuckerbrod et al. | 429/252 |
| 5,436,091 | A | 7/1995 | Shackle et al. | 429/192 |
| 5,498,489 | A | 3/1996 | Dasgupta et al. | 424/152 |
| 5,540,741 | A | 7/1996 | Gozdz et al. | 29/623.5 |
| 5,547,782 | A | 8/1996 | Dasgupta et al. | 429/194 |
| 5,571,634 | A | 11/1996 | Gozdz et al. | 429/192 |
| 5,584,893 | A | 12/1996 | Mitchell | 29/623.5 |
| 5,588,971 | A | 12/1996 | Fauteux et al. | 29/623.5 |
| 5,591,544 | A | 1/1997 | Fauteux et al. | 429/209 |
| 5,597,659 | A | 1/1997 | Morigaki et al. | 429/190 |
| 5,778,515 | A | 7/1998 | Menon | 28/623.4 |
| 5,928,436 | A | 7/1999 | Borkowski et al. | 136/205 |
| 2002/0012824 | A1 * | 1/2002 | Johnson | 429/17 |
| 2002/0127441 | A1 * | 9/2002 | Johnson | 429/11 |

* cited by examiner

ELECTROCHEMICAL CONVERSION SYSTEM

REFERENCE TO RELATED APPLICATION

This is a continuation in part of U.S. patent application Ser. No. 09/546,654 filed Apr. 10, 2000, pending.

TECHNICAL FIELD

This invention relates to the conversion of heat energy into electrical energy utilizing a hydrogen electrochemical cell.

BACKGROUND OF THE INVENTION

The conversion of chemical energy to electrical energy may be accomplished in a variety of ways. It is known that electrochemical cells or batteries rely on redox reactions wherein electrons from reactant being oxidized are transferred to a reactant being reduced. With the separation of the reactants from each other, it is possible to cause the electrons to flow through an external circuit where they can be used to perform work.

Electrochemical cells however have had a problem related to the exhaustion of the reactants. Although most cells can be recharged by applying a reverse polarity voltage across the electrodes, such recharging requires a separate electrical source. During the recharging of the cell the cell typically is not utilized as an electrical power source, thus rendering it unusable during the recharging period.

Fuel cells have been developed in an effort to overcome problems associated with electrochemical cells. Typically, fuel cells operate by passing an ionized species across a selective electrolyte which blocks the passage of the non-ionized species. By placing porous electrodes on either side of the electrolyte, a current may be induced in an external circuit connecting the electrodes. The most common type of fuel cell is a hydrogen-oxygen fuel cell which passes hydrogen through one of the electrodes while oxygen is passed through the other electrode. The hydrogen and oxygen combine at the electrolyte-electrode interface to produce water. By continuously removing the water, a concentration gradient is maintained to induce the flow of hydrogen and oxygen to the cell.

These types of fuel cells however suffer from a number of disadvantages. These cells must be continuously supplied with a reactant in order to continuously produce electricity. Additionally, these cells produce a continuous product stream which continuously must be removed, the removal of which may pose a problem. The porous electrodes of these fuel cells must allow the passage of the reactant entering the cell. However, over time these porous electrodes can become fouled or plugged so as to slow or even prevent the passage of the reactant. Such slowing of the reactant flow reduces the production of electricity. Lastly, the selection of an appropriate electrolyte is not always easy. The electrolyte must rapidly transport the ionized species in order to increase the current production. Frequently, the limited migration of the ionized species through the electrolyte is a limiting factor on the amount of current produced.

In an effort to avoid the problems inherent with the previously described fuel cells, thermoelectric conversion cells have be designed. These thermoelectric conversion cells utilize heat to produce a pressure gradient to induce the flow of a reactant, such as molten sodium, across a solid electrolyte. A current is generated as sodium atoms lose electrons upon entering the electrolyte and gain electrons upon leaving the electrolyte. These cell however also suffer from the plugging of the porous electrodes required to pass the sodium ions. Furthermore, the diffusion of the sodium ions through the solid electrolytes has proven to be slow, thereby limiting the amount of current produced by the cell. Lastly, these types of fuel cells operate at extremely high temperatures, typically in a range between 1,200–1,500 degrees Kelvin, making them impractical for many uses.

Another problem associated with thermoelectric conversion cells has been their dependency upon an heat source to enable the operation of the cell. As such, these fuel cells have typically been rather large in size. Furthermore, the requirement of these cells to include a heat source has oftentimes prevented their use in remote area where it would be impractical to locate and operate such.

Accordingly, it is seen that a need remains for an electrochemical conversion system that does not require a continuous source of reactant, which does not require an electrolyte which may become plugged over time, which may operate without notice, and which may be operated at relatively low temperatures. It is to the provision of such therefore that the present invention is primarily directed.

SUMMARY OF THE INVENTION

In a preferred form of the invention an electrochemical conversion system comprises a mass of thermal inertial core material, a first mass of hydrogen absorbent material surrounding at least a majority of the thermal inertial core material, the first mass of hydrogen absorbent material being in thermal communication with the mass of thermal inertial core material so as to transfer heat therebetween, a second mass of hydrogen absorbent material spaced from and surrounding at least a majority of the first mass of hydrogen absorbent material, an electrochemical cell mounted between the first mass of hydrogen absorbent material and the second mass of hydrogen absorbent material, a housing containing the first mass of hydrogen absorbent material, the second mass of hydrogen absorbent material, the electrochemical cell, the housing being adapted to transfer heat between the second mass of hydrogen absorbent material and ambience, and a supply of hydrogen. With this construction, the first and second masses of hydrogen absorbent material are in fluid communication with each other through the electrochemical cell whereby the hydrogen may be desorbed by one mass of hydrogen absorbent material and absorbed by the other mass of hydrogen absorbent material while passing through and reacting with the electrochemical cell so as to cause an electric potential electrochemical cell.

DETAILED DESCRIPTION

Figure 1:
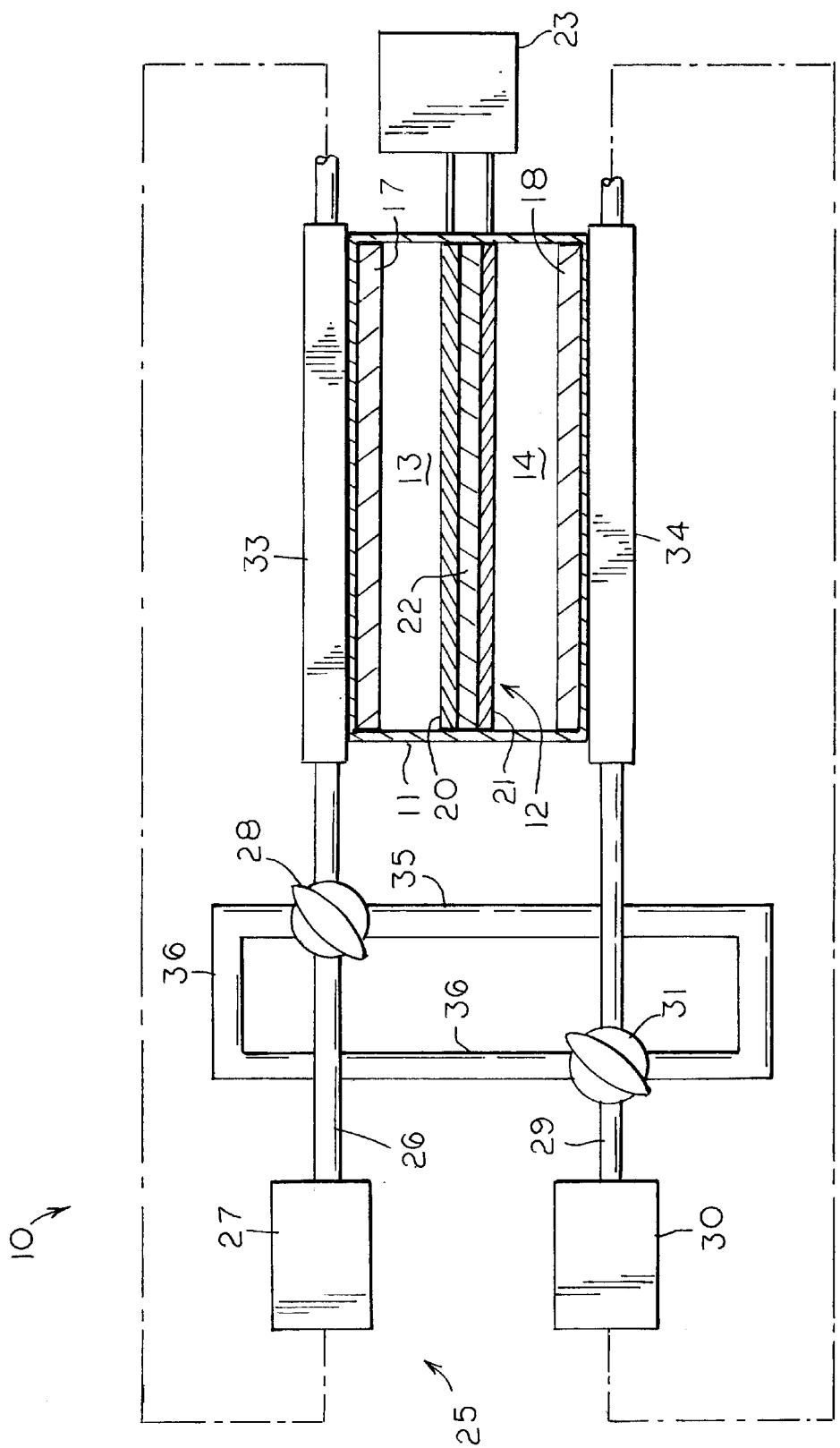
FIG. 1 is a schematic view of an electrochemical conversion system in a preferred form of the invention.

With reference next to the drawings, there is shown in FIG. 1 an electrochemical conversion system 10 in a preferred form of the invention. The system 10 has a housing 11 made of a non-reactive metal, such as stainless steel, in which is mounted an electrochemical or hydrogen concentration cell 12. The combination of the housing 11 and the concentration cell 12 define a first chamber 13 and a second chamber 14 separated from each other by the concentration cell 12. A first mass of hydride material 17, such as $LaNi_{4.7}Al_{0.3}$, $TiFe_{0.9}Mn_{0.1}$, liquid hydride, or other similar material, is contained within the first chamber 13. Similarly, a second mass of hydride material 18 is contained within the second chamber 14. For clarity of explanation the terms hydride, metal hydride, hydrogen absorbent material, liquid hydride materials and hydrogen absorbent metal material are equivalent.

The electrochemical cell 12 has a first gas diffusion electrode 20, a second gas diffusion electrode 21 and a proton conductive membrane 22, such as Nafion made by E. I du Pont de Nemours, mounted between the first and second gas diffusion electrodes. This type of electrochemical cell 12 is available from E-Tek, Inc. of Somerset, N.J. The electrochemical cell electrodes 20 and 21 are electrically coupled to an external load or circuit 23.

The system 10 also includes an alternating heat transfer system 25 which selectively transfers heat to one mass of metal hydride material while absorbing heat from the other mass of metal hydride material. The heat transfer system 25 may utilize any form of heat source such as electric heaters, gas burning heaters, heated air, radiation heat sources, radiant heaters or other conventionally known means for producing heat. The heat transfer system 25 may also utilize any form of heat absorbing or dissipating means (heat sink), such as cooled fluids.

Here, the heat transfer system 25 has a network of conduits coupled to control valves which control the flow of the heated and cooled fluids passing through the conduit network. In more detail, the heat transfer system 25 has a heating input conduit 26 extending between a heating fluid source 27 and a first control valve 28, and a cooling input conduit 29 extending between a cooling fluid source 30 and a second control valve 31. The first control valve 28 is coupled to a first heat transfer manifold 33 positioned to transfer heat to and from the first mass of metal hydride material 17. Similarly, the second control valve 31 is coupled to a second heat transfer manifold 34 positioned to transfer heat to and from the second mass of metal hydride material 18. A first bridging conduit 35 extends between the first control valve 28 and the second control valve 31. A second bridging conduit 36 extends between the second control valve 31 and the first control valve 28.

The first control valve 28 is operable between a first position wherein fluid flowing through the heat input conduit 26 flows to the first heat transfer manifold 33 and a second position wherein the heated fluid flowing through the heat input conduit 26 flows through the first bridging conduit 35 to the second control valve 31. The second control valve 31 is operable between a first position wherein cooling fluid flowing through the cooling input conduit 29 flows to the second heat transfer manifold 34 and a second position wherein the cooling fluid flowing through the cooling input conduit 29 flows through the second bridging conduit 36 to the first control valve 28. With the first and second control valve 28 and 31 in their second positions, cooling fluid flowing into and through the second bridging conduit 36 continues into the first heat transfer manifold 33. Similarly, with the first and second control valves 28 and 31 in their second positions fluid flowing into and through the first bridging conduit 35 continuous into the second heat transfer manifold 34. In short, with the first and second control valves in their first positions the heated fluid from the heat input conduit 26 is conveyed into the first heat transfer manifold 33 while the cooling fluid from the cooling input conduit 29 is conveyed into the second heat transfer manifold 34. With the control valves repositioned to their second positions the flows of the fluids are alternated so that the heated fluid flowing from the heat input conduit 26 is now conveyed to the second heat transfer manifold 34 and the cooling fluid flowing from the cooling input conduit 29 is now conveyed to the first heat transfer manifold 33.

In use, the control valves 28 and 31 are positioned in their first position so that a heated fluid passing through the heat input conduit 26 is directed into the first heat transfer manifold while a cooling fluid passing through the cooling input conduit 29 is directed into the second heat transfer manifold 34. The heated fluid within the first heat transfer manifold 33 heats the first mass of metal hydride material 17 within the first chamber 13. The heating of the metal hydride material causes the metal hydride material to release hydrogen gas into the first chamber 13, thereby causing a pressure increase within the first chamber 13. Conversely, the cooling fluid within the second heat transfer manifold 34 cools the second mass of metal hydride material 18 within the second chamber 14. The cooling of the metal hydride material causes it to absorb any hydrogen gas within the second chamber 14, thereby causing a pressure decrease within the second chamber.

As the pressure differential between the first and second chambers 13 and 14 increases an electrical potential across the cell is created and progressively increased, for as a current is passed through the external load 23 hydrogen gas at the higher pressure first chamber adjacent the first electrode 20 is oxidized into protons. These protons are conducted through the proton conductive membrane 22 to the second electrode 21 at the lower pressure second chamber 14, where it is reduced into hydrogen gas and spontaneously absorbed by the second mass of metal hydride material 18. The oxidation of the hydrogen gas causes the release of electrons which are then passed to the first electrode while the reduction of protons into hydrogen gas causes the acceptance or receiving of electrons from the second electrode, thereby inducing a current. The absorption of the hydrogen by the second mass maintains the second chamber 14 at a low pressure state. The second mass continues to absorb hydrogen gas until the metal hydride material approaches its saturation point. The net result is that the high pressure hydrogen gas is transferred from the first chamber 13 to the second chamber 14 through the electrochemical cell 12 until hydrogen gas in chamber 13 is depleted or the circuit 23 is turned off.

Once the first mass of metal hydride material 17 has released its associated hydrogen and the second mass of metal hydride material 18 has become substantially saturated with hydrogen, i.e. an equilibrium is reached, the heat transfer process is reversed. The heat transfer process is reversed by actuating the first and second control valves 28 and 31 to their second positions. Thus, the heating fluid flowing from the heat input conduit 26 is directed into the first bridging conduit 35 so as to flow to the second control valve 31 which then directs the heating fluid into the second heat transfer manifold 34. Similarly, the cooling fluid flowing from the cooling input conduit 29 is directed into the second bridging conduit 36 so as to flow to the first control valve 28 which then directs the cooling fluid into the first heat transfer manifold 33. As such, the second mass of metal hydride material 18 is now heated so as to release the hydrogen gas into the second chamber 14 thereby increasing the pressure therein. Conversely, the first mass of metal hydride material 17 is now cooled thereby causing it to absorb hydrogen gas and thereby decrease the pressure within the first chamber 13. The pressure differential between the first and second chambers once again causes the hydrogen gas to pass through the electrochemical cell, albeit now in the opposite direction, thereby creating electricity as previously described.

The transfer of hydrogen across the electrochemical cell creates an energy (work) in the form of electrical energy through the external load. The voltage across the electrochemical cell may be calculated by utilizing the following equation:

$$E=(RT/2F)(\ln)(P_h/P_l)$$

where R is the gas constant, T is the cell temperature, F is Faraday constant, and it is assumed that the temperature across the electrochemical cell is uniform. With this formula it can be calculated that the open circuit voltage for a single cell is 59.2 mV and that the electrical energy the concentration cell can provide is approximately 11.4 kJ for transferring one mole of hydrogen gas through the cell at 25 C. if the pressure ratio between the first and second chambers is 100:1. To generate a hydrogen pressure ratio, the temperature difference required between the heat source and the heat sink can be estimated utilizing the following equation:

$$\Delta T=T_l((RT_l\ln(P_h/P_l))/(-\Delta H))/1+((RT_l\ln(P_h/P_l))/\Delta H)$$

where $\Delta H$ is the hydrogen desorption enthalpy. In deriving this equation, a linear relationship between logarithm of hydrogen pressure and the reciprocal of temperature is used. Thus, assuming that the heat sink temperature is 25 C. and the hydrogen desorption enthalpy is equal to $-30$ kJ/mol, the temperature difference required for generating a pressure ratio of 100:1 can be estimated to be 183 C. Accordingly, it can be understood that the hydrogen pressure can be greatly increased by a relatively low heating of the metal hydride material.

It should be understood that except for minor issues due to gas diffusion, the hydrogen gas cannot penetrate through the electrochemical cell at open circuit. However, when the electrochemical cell is under load hydrogen gas is oxidized and conducted through the membrane as protons where it is then reduced back to hydrogen gas, thereby providing an electric potential energy to the external load.

Figure 2:
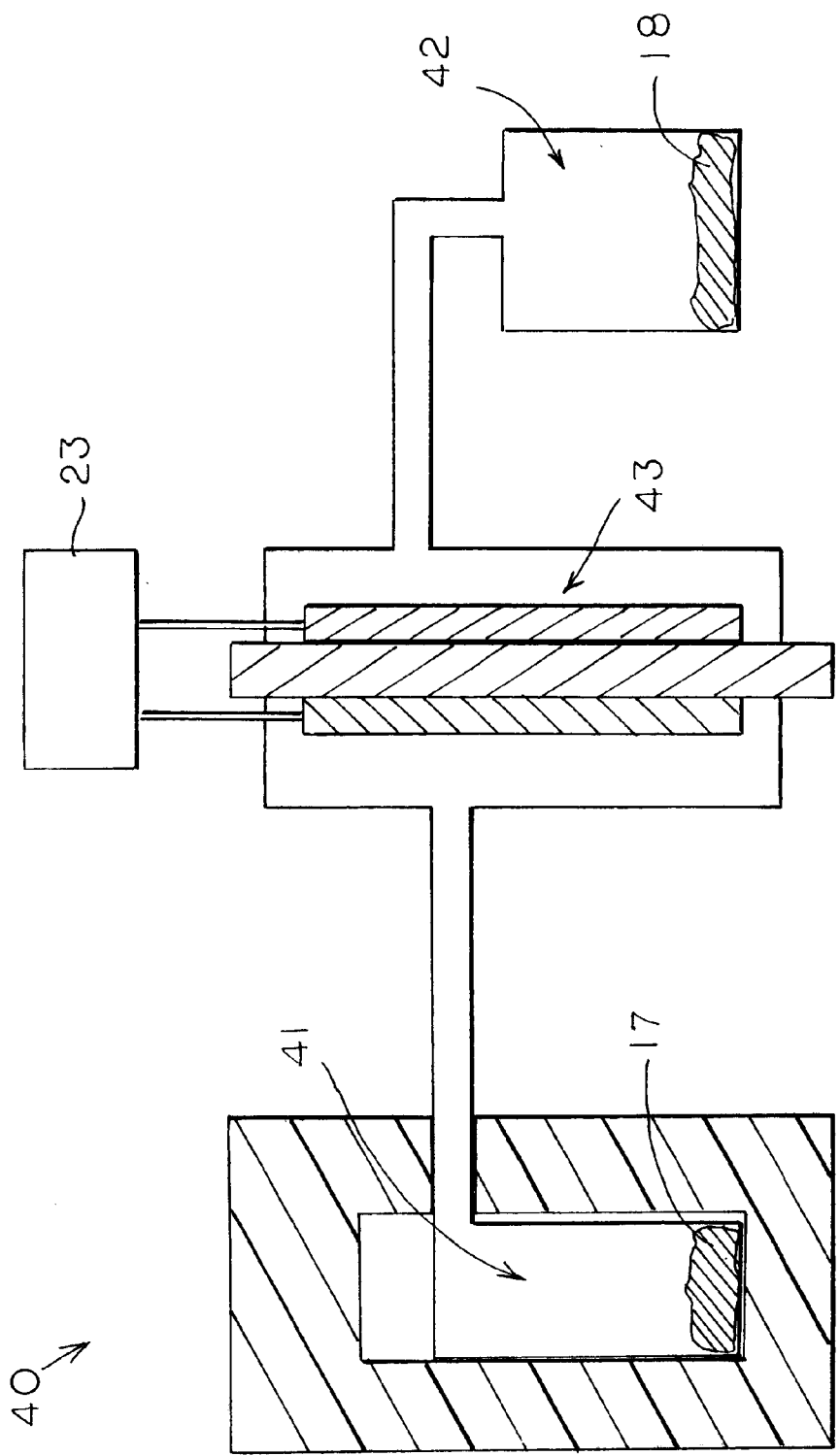
FIG. 2 is a schematic view of an electrochemical conversion system in another preferred form of the invention.

With reference next to FIG. 2, there is shown an electrochemical conversion system 40 in another preferred form of the invention. The system 40 has a first chamber 41 thermally insulated from ambience and includes heat sink/source material 44, a second chamber 42 exposed to ambience, and an electrochemical cell 43 therebetween. This system may be utilized within a home to convert ambient heat to electricity or to utilized heat released by or absorbed by the reacting metal hydrides. As such, the heating and cooling means is provided by the environment.

In use, during the heat of the day the second chamber 42 is exposed to ambient heat while the insulated, first chamber 41 remains cool. The heating of the second chamber while the first chamber remains cool causes the release of hydrogen within the second chamber so as to create a pressure differential. The release of hydrogen increases the pressure within the second chamber. The pressure differential between the first and second chambers causes the hydrogen to pass from the second chamber to the first chamber through the electrochemical cell 43, thereby creating electricity as previously described. The absorption of hydrogen in the metal hydride of the first chamber elevates its temperature to that of the second chamber. Equilibrium is eventually achieved between the two chambers at which time hydrogen transfer and the associated current flow stops. As the day turns to night, the ambient temperature assumably drops below that of the insulated first chamber 41. The temperature difference, and thereby the pressure difference, causes the hydrogen gas within the first chamber's metal hydride material to be released, thereby increasing the pressure within the first chamber. This pressure difference causes the hydrogen to pass from the first chamber 41 to the second chamber 42, i.e. reversing the process. Heat sink/source material 44 (water, paraffin phase change material, or other high heat capacity material) is included in the first chamber to absorb heat from the metal hydride during the exothermic hydrogen absorption process. This helps to thermally stabilize the hydride allowing it to absorb more hydrogen than it otherwise would be able to without the material 44. Similarly material 44 acts as a heat source when hydrogen is being released from the hydride in chamber 41 to support the endothermic desorption process. The amount of hydrogen that can be absorbed or desorbed during a given cycle has a direct relationship with the amount of heat that can be stored and released by material 44.

Figure 3:
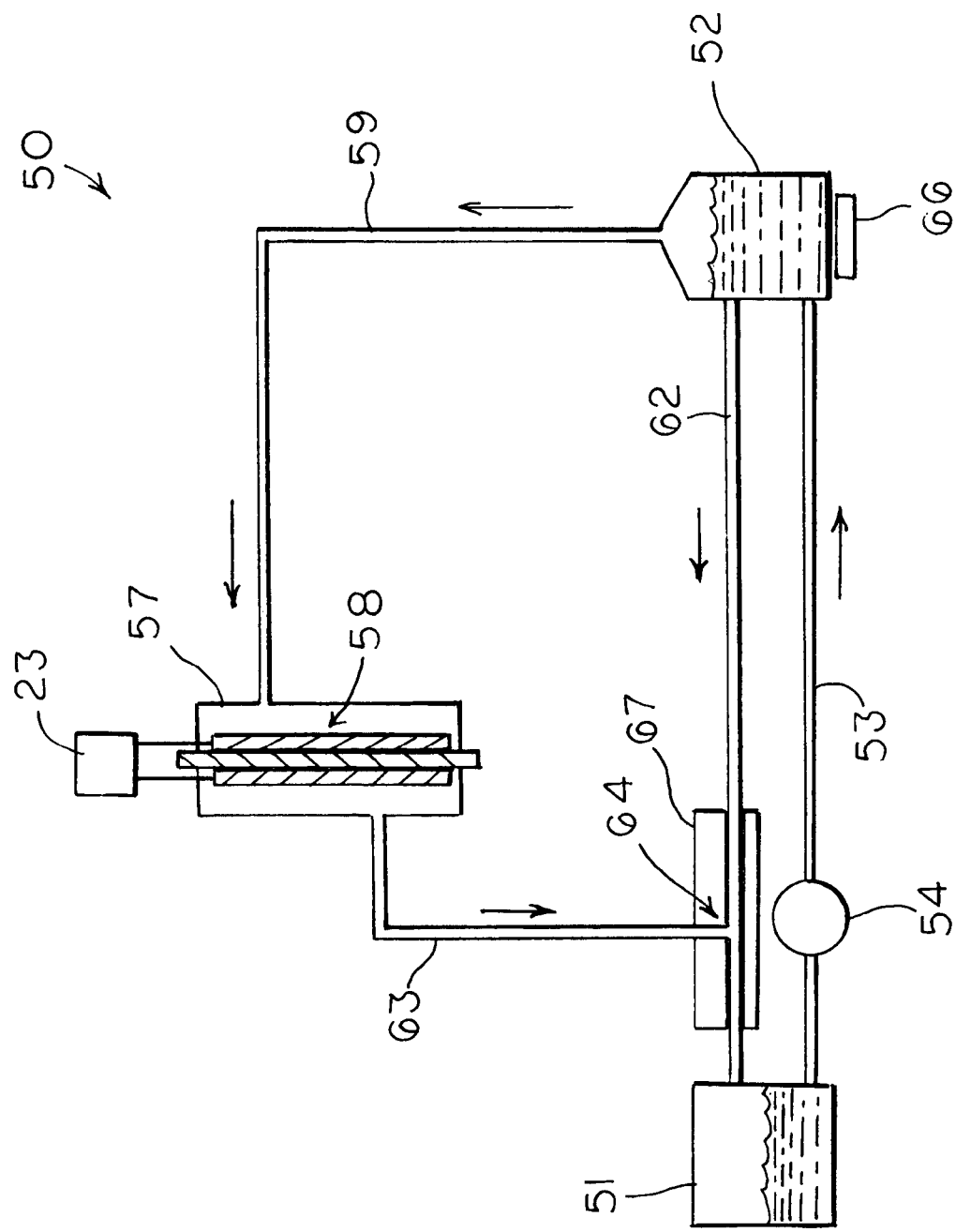
FIG. 3 is a schematic view of an electrochemical conversion system in another preferred form of the invention.

Referring next to FIG. 3, there is shown an electrochemical conversion system 50 in yet another preferred form of the invention. The system 50 has a first chamber 51 and a second chamber 52 in fluid communication with each other through a transfer conduit 53 having a liquid pump 54 which pumps liquid from the first chamber 51 to the second chamber 52. The system 50 also has a reaction chamber 57, containing an electrochemical conversion cell 58, in fluid communication with the second chamber 52 through a first gas conduit 59. The system also has a liquid conduit 62 extending from the second chamber 52 to the first chamber 51 and a second gas conduit 63 extending from the reaction chamber 57 to a junction 64 in the liquid conduit 62. A heating source 66 is positioned to transfer heat to the second chamber 52 while a cooling source or heat exchanger 67 is coupled to remove heat at the junction 64 of the liquid conduit 62 and second gas conduit 63, or thereafter within the first chamber. A supply of hydrogen gas concentrated hydride liquid is contained within the system 50. The hydride liquid may be HySorb organometallic liquid such as organometallic dihydrogen complexes containing dihydrogen ligands a specific example of which is cyclopentadienyl dihydrogen.

In use, the liquid hydride within the second chamber 52 is heated by the heat source 66 to a temperature to cause the release of hydrogen gas from the liquid hydride. The hydrogen gas passes through the first gas conduit 59 and into the reaction chamber 57 wherein the pressure differential therein causes the hydrogen gas to pass through the conversion cell 58 to create electricity as previously described. The hydrogen gas then continues through the second gas conduit 63 to the junction 64. Simultaneously, the hydrogen depleted liquid passes from the second chamber 52 through the liquid conduit 62 and through the junction 64 whereby the cooling source 67 extracts the heat from the hydrogen depleted liquid and hydrogen gas so that the hydrogen gas mixing with the liquid at the junction recombines with the liquid to form a hydride liquid. The recombined hydride liquid and any remaining hydrogen gas and hydrogen depleted liquid passes into the first chamber 51 wherein the remaining hydrogen depleted liquid may continue to recombine with the remaining hydrogen gas. The hydride liquid may then be pumped through the transfer conduit 53, by the liquid pump 54, into the second chamber 52 wherein it may be cycled through the system again. It should be noted that the system may be used continuously or in batched sequence.

It should also be understood that the heating of the metal hydride material provides for a much greater fluctuation in gas pressure within the chambers than the heating of gas alone. For it should be noted that the desorption enthalpy is very large for these materials, typically in the order of −30 kJ/mole. As such, a temperature change of merely 150° C. may change the pressure by two orders (100). For example, the hydrogen pressure equilibrium with the metal hydride may increase from 0.42 atm to 42 atm with a temperature change from 25° C. to 175° C. Comparably, a temperature change of 150° C. for hydrogen gas merely increases the gas pressure from 0.42 atm to 0.60, an increase of only 42%. As such, it can be seen that utilizing metal hydride is an effective means of converting thermal energy (related to temperature) to mechanical energy (related to pressure) through a pressure differential. Furthermore, this system converts energy without any mechanically moving part except for the control valves.

Lastly, it should be understood that by controlling the passage of the electrical current one may control the flow of the hydrogen across the electrochemical cell. As such, the rate of heat removed from the high temperature side can be controlled precisely based on the hydrogen desorption enthalpy and the hydrogen flow rate. It should be noted that when a metal hydride releases hydrogen it absorbs heat from its environment, i.e. an endothermic reaction, while the adsorption of hydrogen gas causes the release of heat to its environment, i.e. an exothermic reaction. Consequently, the temperature at the heat source side can be controlled in this manner for refrigeration purposes.

Figure 5:
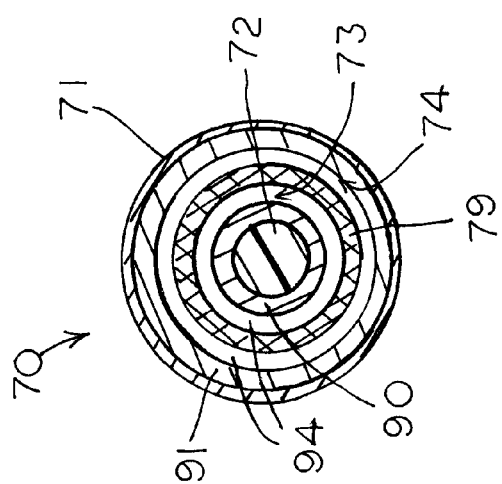
FIG. 5 is a cross-sectional side view of an electrochemical conversion system of FIG. 4.
Figure 4:
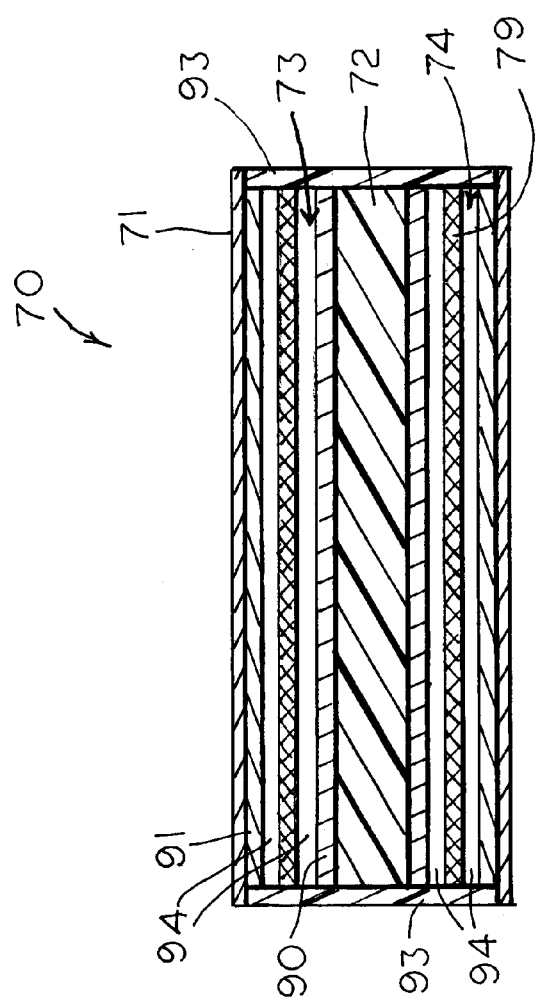
FIG. 4 is a cross-sectional view showing an electrochemical conversion system in yet another preferred form of the invention.

With reference next to FIGS. 4 and 5, there is shown an electrochemical conversion system 70 in another preferred form of the invention. The system 70 has a thin, thermally conductive generally tubular housing 71, a centrally positioned heat exchanger or thermal inertial core 72, and an internally mounted, previously described electrochemical cell 79, generally in the form of a tube, which in combination with the housing forms a first chamber 73 and a second chamber 74 in fluid communication with the first chamber 73 through the electrochemical cell 79. The system 70 has a generally tubular first mass of metal hydride material 90 positioned within the first chamber 73 and surrounding the thermal inertial core 72, and a generally tubular second mass of metal hydride material 91 positioned within the housing second chamber 74 and surrounding the first mass of metal hydride material 90. The system 70 also has two thermally insulative ends 93 and two thermal isolation gaps 94 between the electrochemical cell 79 and the two masses of metal hydride material 90 and 91. The thermal inertial core 72 is designed to absorb and dissipate heat and is preferably made of a phase change paraffin wax such as eicosane, however other types of heat transferring materials may be utilized.

Here, the system is designed to be operated in ambient conditions. As such, the first mass of metal hydride material 90 is maintained at a generally stable temperature as it is positioned in thermal communication with the thermal inertial core 72 which acts as a heat exchanger to minimize temperature variations. Simultaneously, the second mass of metal hydride material 91 is exposed to ambience through the housing 71 and therefore is subject to temperature changes resulting from ambient changes in temperature. During operation, this system 70 converts ambient heat to electricity through the heat released by or absorbed by the reacting metal hydrides. As such, the heating and cooling means is provided by the environment.

In use, with the first chamber 73 and the first mass of metal hydride material 90 therein in thermal communication with the thermal inertial core 72 the first mass of metal hydride material 90 is maintained at a generally constant temperature. However, during the heat of the day the second chamber 91 is exposed to ambient heat through the housing 71 wherein the heating of the second chamber 74 and the cooler temperature of the first chamber 73 causes the release of hydrogen from the second mass of material 91 within the second chamber 74 so as to create a pressure differential. The pressure differential between the first and second chambers 73 and 74 causes the hydrogen to pass from the second chamber 74 to the first chamber 73 through the electrochemical cell 79 where it is absorbed by the first mass of material 90, thereby creating electricity as previously described. This electricity may be utilized as immediate power or may be stored within an electricity storage device such as a battery or capacitor for later use.

As the day turns to night, the ambient temperature and thus the temperature of the second mass of metal hydride material 91 assumably drops below that of the thermally stable first chamber 73. The temperature difference between the two chambers 73 and 74, and thereby the pressure difference, causes the hydrogen gas in the first mass of material 90 within the first chamber 73 to be released, thereby increasing the pressure within the first chamber 73. This pressure difference causes the hydrogen to pass back from the first chamber 73 to the second chamber 74 through the electrochemical cell 79 where it is absorbed by the second mass of material 91, i.e. reversing the direction of the process while still creating electricity.

It should be understood that a system of this type may be manufactured and operated in a manner and size which would replace conventional batteries. To illustrate this aspect, a typical "AA" size battery contains approximately 1,000 mWhrs of energy. Under normal conditions these batteries consume ten mWhrs per day, thus, after three months of use these batteries are depleted. It is believed that a system manufactured in the just described manner may have a volume of approximately 5.5 cc. Assuming the material for the housing occupies 0.1 cc the remaining battery components occupy 5.4 cc. As such, the thermal inertial core 72 may occupy 3 cc while each mass of metal hydride material 90 may occupy 1 cc. The remaining 0.4 cc of volume is taken up by the electrochemical cell 79 and the associated thermal isolation gaps 94.

Each gram of metal hydride material is capable of producing 1.07 Ah of current. As the density of a typical metal hydride powder is approximately 8 g/cc, the useful amount of hydrogen is approximately 0.04 g/cc. This amount of hydrogen is equivalent to 0.04×96,487=3,859 coulombs/cc or 1.07 Ah/cc.

Assuming a temperature fluctuation of 10 degrees Celsius between the core 72 and the outer housing 71, the output voltage for the system 70 would be 5.3 mV. Therefore, for an average temperature difference of 10 degrees Celsius and a transfer of 0.04 g of hydrogen across the electrochemical cell 79, the energy output is 5.3×1.07=5.7 mWh. Assuming that his amount of energy is produced during the warming ambient temperature transient, an equivalent amount of energy would be produced during the cooling transient.

Thus, the total energy produced during a daily ambient temperature cycle would be 11.4 mWh (5.7 mWh×2).

It should be understood that the term tubular may include structures which are of any cross-sectional shape, which may or may not include end walls or end caps, which may be only partially tubular, or which may be incomplete tubes. It is preferable that the first mass 90 surround at least a majority of the thermal inertial core 72, that the electrochemical cell 79 surround at least a majority of the first mass 90, and that the second mass 91 surround at least a majority of the electrochemical cell 79.

Lastly, it should be understood that the system may be utilized in a controlled environment wherein "ambient" heating and cooling environment are provided, such as positioning the system wherein hot and/or cold water pass over the housing to induce a temperature difference, or repositioning the system in different environments such as alternating being a heated atmosphere and a cooling liquid bath. This may be economically achieved in instances wherein hot water is produced as a byproduct, such as in nuclear power plants. As such, the term "ambient" is meant to include all environment types or outside influences effecting the system.

With regard to all shown embodiments, it should also be understood that the system may utilize several electrochemical cells aligned parallel to each other so that the hydrogen gas passes through each cell in succession. Several electrochemical cells may also be positioned upon one membrane and connected in series or in parallel to each other.

It thus is seen that an electrochemical conversion system is now provided which is efficient and which may be operated in place of a conventional battery. It should of course be understood that many modifications, in addition to those specifically recited herein, may be made to the specific preferred embodiments describe herein without departure from the spirit and scope of the invention as set forth in the following claims.

What is claimed is:

1. An electrochemical conversion system comprising:
   a mass of thermal inertial core material;
   a first mass of hydrogen absorbent material surrounding at least a majority of said thermal inertial core material, said first mass of hydrogen absorbent material being in thermal communication with said mass of thermal inertial core material so as to transfer heat therebetween;
   a second mass of hydrogen absorbent material spaced from and surrounding at least a majority of said first mass of hydrogen absorbent material;
   an electrochemical cell mounted between said first mass of hydrogen absorbent material and said second mass of hydrogen absorbent material;
   a housing containing said first mass of hydrogen absorbent material, said second mass of hydrogen absorbent material, said electrochemical cell, said housing being adapted to transfer heat between said second mass of hydrogen absorbent material and ambience; and
   a supply of hydrogen;
   whereby the first and second masses of hydrogen absorbent material are in fluid communication with each other through the electrochemical cell and whereby the hydrogen may be desorbed by one mass of hydrogen absorbent material and absorbed by the other mass of hydrogen absorbent material while passing through and reacting with the electrochemical cell so as to cause an electric potential difference with the electrochemical cell.

2. The electrochemical conversion system of claim 1 wherein said mass of thermal inertial core material is a paraffin wax.

3. The electrochemical conversion system of claim 1 wherein said first mass is tubular.

4. The electrochemical conversion system of claim 3 wherein said electrochemical cell is tubular.

5. The electrochemical conversion system of claim 4 wherein said second mass is tubular.

6. The electrochemical conversion system of claim 1 wherein said first and second masses of hydrogen absorbent material are comprised of hydrogen absorbent metal hydride.

7. The electrochemical conversion system of claim 1 wherein said electrochemical cell includes a first electrode, a second electrode, a proton conductive membrane positioned between said first electrode and said second electrode.

8. The electrochemical conversion system of claim 1 wherein said electrochemical cell surrounds at least a majority of said first mass of hydrogen absorbent material.

9. An electrochemical conversion system comprising:
   a tubular housing;
   an outer tubular mass of hydrogen absorbent material positioned within and in thermal communication with said tubular housing;
   a tubular electrochemical cell mounted within said tubular outer mass of hydrogen absorbent material;
   an inner tubular mass of hydrogen absorbent material positioned within said tubular electrochemical cell;
   a thermal inertial core mounted within and in thermal communication with said tubular inner mass of hydrogen absorbent material; and
   a supply of hydrogen absorbable and desorbable by said outer and inner masses of hydrogen absorbent material,
   whereby the inner mass of hydrogen absorbent material is in thermal communication with the thermal inertial core so as to provide a stable temperature heat source to the inner mass of hydrogen absorbent material while the outer mass of hydrogen absorbent material is in thermal communication with the housing so that as the temperature of the outer mass of hydrogen absorbent material fluctuates over time a temperature differential is created between the outer mass and the inner masses of hydrogen absorbent material.

10. The electrochemical conversion system of claim 9 wherein said electrochemical cell includes a first electrode, a second electrode and a proton conductive membrane positioned between said first electrode and said second electrode.

11. The electrochemical conversion system of claim 9 wherein said hydrogen absorbent material is comprised of a hydrogen absorbent metal hydride.

12. A method of producing electricity comprising the steps of,
   mounting a thermally stable material in thermal communication with a first mass of hydrogen absorbent material while simultaneously exposing an exterior housing mounted in thermal communication with a second mass of hydrogen absorbent material to ambience so as to transfer ambient heat to the second mass of hydrogen absorbent material,
   mounting the first mass of hydrogen absorbent material within said second mass of hydrogen absorbent material,
   flowing hydrogen from one mass of hydrogen absorbent material to the other mass of hydrogen absorbent material and through an electric conversion cell having two spaced apart electrodes and a proton conductive membrane positioned between the electrodes which selectively passes hydrogen protons therethrough, the hydrogen protons being produced from the oxidation of hydrogen gas passing past one of the electrodes, the hydrogen flow being induced by a temperature differential between the masses of hydrogen absorbent materials created by the temperature differential between the first housing portion and the second housing portion, and therefore a pressure differential across the cell resulting from the release of hydrogen from a mass of hydrogen absorbent material, whereby an electric current is induced through a load coupled to the electrodes.

13. The method of claim 12 wherein said hydrogen absorbent material is a metal hydride material.

* * * * *